US012619224B2

(12) United States Patent
Lee

(10) Patent No.: US 12,619,224 B2
(45) Date of Patent: May 5, 2026

(54) PROCESSOR INCLUDING MODIFIED RADIAL BASIS FUNCTION (RBF) NEURAL NETWORK AND METHOD OF PROVIDING THE MODIFIED RBF NEURAL NETWORK

(71) Applicant: SEMES CO., LTD.,
Chungcheongnam-do (KR)

(72) Inventor: Jisub Lee, Osan-si (KR)

(73) Assignee: SEMES CO., LTD.,
Chungcheongnam-do (KR)

( * ) Notice: Subject to any disclaimer, the term of this patent is extended or adjusted under 35 U.S.C. 154(b) by 435 days.

(21) Appl. No.: 18/135,680

(22) Filed: Apr. 17, 2023

(65) Prior Publication Data

US 2023/0359188 A1 Nov. 9, 2023

(30) Foreign Application Priority Data

May 3, 2022 (KR) ........................ 10-2022-0055028

(51) Int. Cl.
*G05B 23/02* (2006.01)
(52) U.S. Cl.
CPC .................................. *G05B 23/024* (2013.01)
(58) Field of Classification Search
None
See application file for complete search history.

(56) References Cited

U.S. PATENT DOCUMENTS

| | | | |
|---|---|---|---|
| 12,367,379 B2 * | 7/2025 | Jun ........................ G06N 5/045 |
| 2018/0267886 A1 * | 9/2018 | Durga ................. G06F 11/3668 |
| 2018/0276531 A1 | 9/2018 | Han et al. |
| 2021/0133536 A1 | 5/2021 | Huang et al. |
| 2022/0100997 A1 | 3/2022 | Zhang et al. |

FOREIGN PATENT DOCUMENTS

| | | | | |
|---|---|---|---|---|
| CN | 102005743 A | * | 4/2011 | |
| WO | WO-2006118549 A1 | * | 11/2006 | ............... G06T 7/38 |
| WO | 2016/040626 | | 3/2016 | |

OTHER PUBLICATIONS

Office Action dated Nov. 29, 2024 for Korean Patent Application No. 10-2022-0055028 and its English machine translation.
Notice of Allowance dated Aug. 14, 2025 for Korean Patent Application No. 10-2022-0055028 and its English translation from Global Dossier.

* cited by examiner

*Primary Examiner* — Mi'schita' Henson
(74) *Attorney, Agent, or Firm* — WOMBLE BOND DICKINSON (US) LLP

(57) ABSTRACT

Provided is a method of providing a modified radial basis function (RFB) neural network. The method includes providing the modified RBF neural network configured to determine a breakdown of semiconductor equipment, wherein the modified RBF neural network assigns, to each of components of the measurement data, a standardization coefficient dependent on the components of the measurement data.

20 Claims, 2 Drawing Sheets

PROVIDE RADIAL BASIS FUNCTION (RBF) NEURAL NETWORK — P10

PROVIDE MODIFIED RBF NEURAL NETWORK BASED ON RBF NEURAL NETWORK — P20

PROCESSOR INCLUDING MODIFIED RADIAL BASIS FUNCTION (RBF) NEURAL NETWORK AND METHOD OF PROVIDING THE MODIFIED RBF NEURAL NETWORK

CROSS-REFERENCE TO RELATED APPLICATION

This application is based on and claims priority under 35 U.S.C. § 119 to Korean Patent Application No. 10-2022-0055028, filed on May 3, 2022, in the Korean Intellectual Property Office, the disclosure of which is incorporated by reference herein in its entirety.

BACKGROUND

1. Field

One or more embodiments relate to a processor including a modified radial basis function (RBF) neural network and a method of providing the modified RBF neural network.

2. Description of Related Art

A yield rate of a semiconductor device is directly related to manufacturing costs, therefore the yield rate is the most essential element in semiconductor device manufacturing. To improve the yield rate of a semiconductor device, it is highly important to monitor a state of semiconductor equipment in real time and predict a breakdown of the semiconductor equipment.

A breakdown of semiconductor equipment causes defects in a semiconductor device, and in certain cases, induces immense repair costs. To prevent these problems, a method and a system for predicting the breakdown of semiconductor equipment are required.

SUMMARY

One or more embodiments include a processor including a modified radial basis function (RBF) neural network and a method of providing the modified RBF neural network.

Objectives of the disclosure are not limited to those mentioned above, and other unmentioned objectives will be clearly understood by one of ordinary skill in the art from the descriptions below.

Additional aspects will be set forth in part in the description which follows and, in part, will be apparent from the description, or may be learned by practice of the presented embodiments of the disclosure.

According to one or more embodiments, there is provided a method of providing a modified radial basis function (RBF) neural network. The method includes: providing an RBF neural network configured to determine, based on n-dimensional measurement data with respect to semiconductor equipment, a breakdown of the semiconductor equipment, wherein n is an integer; and based on the RBF neural network, providing a modified RBF neural network, wherein the modified RBF neural network assigns, to each of components of the measurement data, a standardization coefficient dependent on the components of the measurement data.

The standardization coefficient may be n-dimensional.

The standardization coefficient may be determined based on a standard deviation of a corresponding component of the measurement data.

The standardization coefficient may prevent an excessive increase or an excessive decrease of an effect of each of the components of the measurement data on a calculation of the RBF neural network.

When the semiconductor equipment has a breakdown, an RBF value calculated by the modified RBF neural network may be 1.

When the semiconductor equipment has a breakdown, an RBF value calculated by the modified RBF neural network may be 0.

The modified RBF neural network may be configured to determine, based on the following equation, a breakdown of the semiconductor equipment:

$$S_j = \exp\left(-\frac{\sum_{i=1}^{n} w_i * \frac{\|Z_{i,j} - X_i\|^2}{2\sigma_i^2}}{\sum_{i=1}^{n} w_i}\right)$$

where $S_j$ is a modified RBF value calculated based on the measurement data, $w_i$ selects an $i^{th}$ component of the measurement data, $\sigma_i$ standardizes the $i^{th}$ component of the measurement data, $Z_{i,j}$ is an $i^{th}$ component of standard data indicating a normal state of the semiconductor equipment, and $X_i$ is the $i^{th}$ component of the measurement data.

$w_i$ may have a value of 0 or 1.

$w_i$ may have a value determined based on a correlation coefficient between components of the standard data.

According to one or more embodiments, a processor includes a modified radial basis function (RBF) neural network configured to determine, based on measurement data with respect to semiconductor equipment, a breakdown of the semiconductor equipment.

The modified RBF neural network is configured to determine, based on Equation 1 below, the breakdown of the semiconductor equipment:

$$S_j = \exp\left(-\frac{\sum_{i=1}^{n} w_i * \frac{\|Z_{i,j} - X_i\|^2}{2\sigma_i^2}}{\sum_{i=1}^{n} w_i}\right) \quad \text{[Equation 1]}$$

where $S_j$ is a modified RBF value calculated based on the measurement data, $w_i$ selects an $i^{th}$ component of the measurement data, $\sigma_i$ standardizes the $i^{th}$ component of the measurement data, $Z_{i,j}$ is an $i^{th}$ component of standard data indicating a normal state of the semiconductor equipment, and $X_i$ is the $i^{th}$ component of the measurement data.

$w_i$ is determined by Matrix C calculated based on the standard data and Equation 2 below:

$$C = |\text{corr}(Z,Z)| \quad \text{[Equation 2]}$$

wherein Matrix C is a correlation coefficient between components of the standard data.

When an $i^{th}$ component of any one selected from among rows of Matrix C is less than or equal to a threshold value, $w_i$ may have a value of 0.

When an $i^{th}$ component of any one selected from among rows of Matrix C is greater than or equal to a threshold value, $w_i$ may have a value of 1.

The threshold value may be in a range of about 0.5 to about 0.7.

$\sigma_i$ may be a standard deviation of the $i^{th}$ component of the measurement data.

According to one or more embodiments, a method of providing a modified radial basis function (RBF) neural network includes: providing an RBF neural network; and based on the RBF neural network, providing a modified RBF neural network.

The RBF neural network and the modified RBF neural network are configured to monitor semiconductor equipment.

The RBF neural network is configured to determine, based on Equation 1 below, a breakdown of the semiconductor equipment:

$$S'_j = \exp\left(-\frac{\left\|\overrightarrow{Z_j} - \overrightarrow{X}\right\|^2}{\sigma^2}\right)$$

[Equation 1]

where $S'_j$ is an RBF value calculated based on measurement data of the semiconductor equipment, $\overrightarrow{Z_j}$ is standard data indicating a normal state of the semiconductor equipment, $\overrightarrow{X}$ is the measurement data, and $\sigma$ is a standard deviation of the measurement data.

The modified RBF neural network is configured to determine, based on Equation 2 below, a breakdown of the semiconductor equipment:

$$S_j = \exp\left(-\frac{\sum_{i=1}^{n} w_i * \frac{\|Z_{i,j} - X_i\|^2}{2\sigma_i^2}}{\sum_{i=1}^{n} w_i}\right)$$

[Equation 2]

where $S_j$ is a modified RBF value calculated based on the measurement data, $w_i$ selects an $i^{th}$ component of the measurement data, $\sigma_i$ standardizes the $i^{th}$ component of the measurement data, $Z_{i,j}$ is an $i^{th}$ component of the standard data indicating the normal state of the semiconductor equipment, and $X_i$ is the $i^{th}$ component of the measurement data.

The providing of the RBF neural network may include: providing estimation values with respect to $\overrightarrow{Z_j}$ and $\sigma$; and updating $\overrightarrow{Z_j}$ and $\sigma$ to improve accuracy of the RBF neural network.

The providing of the estimation values with respect to $\overrightarrow{Z_j}$ and a may be unsupervised learning.

The updating of <<mth3>> and <<mth4>> may be supervised learning.

$w_i$ may be determined by Matrix C calculated based on the standard data and Equation 3 below:

$C=|corr(Z,Z)|$ [Equation 3]

wherein each of components of Matrix C is an absolute value of a correlation coefficient between components of the standard data.

When an $i^{th}$ component of any one selected from among rows of Matrix C is less than or equal to a threshold value, $w_i$ may have a value of 0.

When the $i^{th}$ component of any one selected from among the rows of Matrix C is greater than or equal to the threshold value, $w_i$ may have a value of 1.

The threshold value may be in a range of about 0.5 to about 0.7.

BRIEF DESCRIPTION OF THE DRAWINGS

The above and other aspects, features, and advantages of certain embodiments of the disclosure will be more apparent

Figure 1:
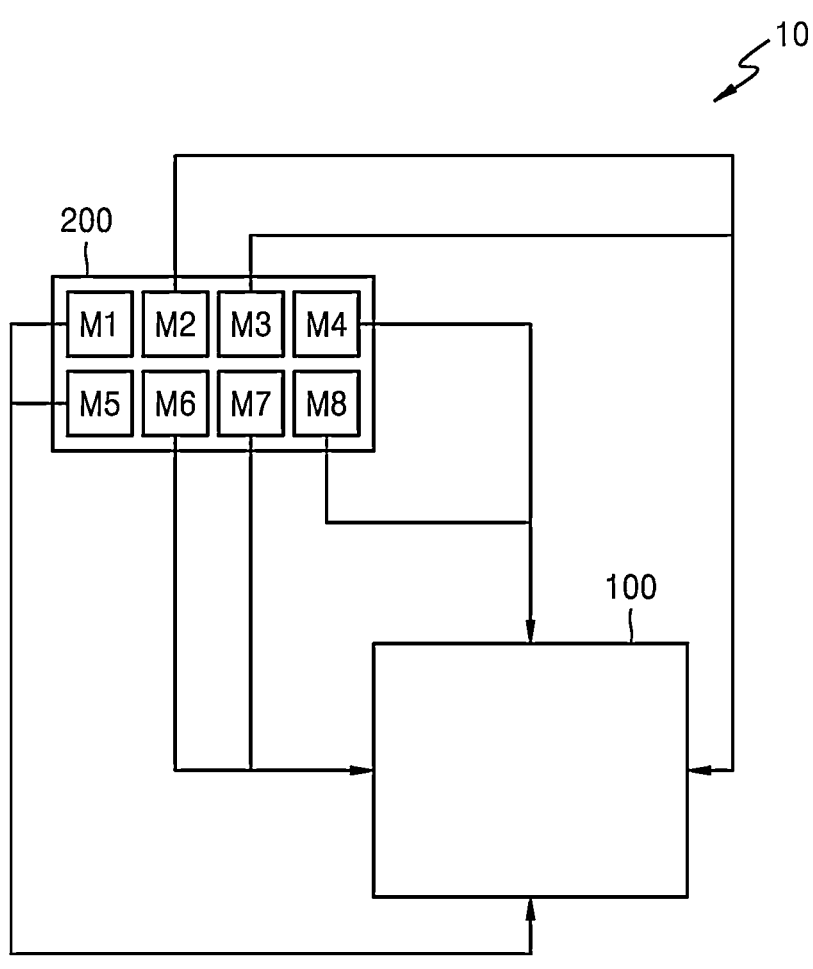

4 from the following description taken in conjunction with the accompanying drawings, in which:

FIG. 1 is a schematic diagram of a system according to embodiments; and

Figure 2:
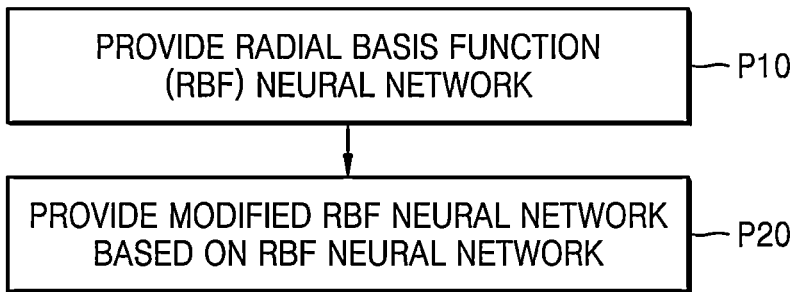

FIG. 2 is a flowchart of a method of predicting a breakdown of equipment, according to embodiments.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments are described in detail with reference to the accompanying drawings. For the same components on the drawings, the same reference numerals are used, and the same descriptions are not given.

FIG. 1 is a schematic diagram of a system 10 according to embodiments.

Referring to FIG. 1, the system 10 may include a processor 100 and equipment 200.

According to embodiments, the equipment 200 may perform a process of manufacturing a semiconductor device. The equipment 200 may be configured to perform, for example, any one of an oxidation process, a lithography process, an etch process, a thin-film process, a metallization process, an electric die sorting (EDS) process, and a packaging process.

The equipment 200 may include a plurality of measuring devices M1, M2, M3, M4, M5, M6, M7, and M8 (hereinafter M1 to M8). The plurality of measuring devices M1 to M8 may measure any one of a parameter and a condition of the equipment 200. Unlike the illustration of FIG. 1, the equipment 200 may include n measuring devices, wherein n is a positive integer.

Here, the parameter may include a variable adjusted for process controlling, during an operation of the equipment 200. Examples of the parameter may include power to drive the whole equipment 200 or portions of the equipment 200. The condition may include a variable indicating a state of the equipment 200. Examples of the condition may include a temperature, a pressure, etc. of the portions of the equipment 200. Hereinafter, the parameter and the condition may be referred to as data.

The plurality of measuring devices M1 to M8 may measure different data from each other. The plurality of measuring devices M1 to M8 may measure the same types of data from different portions of the equipment 200 or different types of data from the same portions of the equipment 200.

According to embodiments, the processor 100 may be configured to monitor the equipment 200 based on measurement values of the plurality of measuring devices M1 to M8. According to embodiments, the processor 100 may be configured to determine a state of the equipment 200 based on the measurement values of the plurality of measuring devices M1 to M8. According to embodiments, the processor 100 may be configured to determine whether the equipment 200 is normal or has a breakdown. According to embodiments, the processor 100 may predict an increased likelihood of a breakdown of the equipment 200.

According to embodiments, the processor 100 may include a modified radial basis function (RBF) neural network. According to embodiments, the processor 100 may calculate a modified RBF value based on the measurement values of the plurality of measuring devices M1 to M8. The modified RBF value may indicate a degree of similarity (or a distance) between a state of the equipment 200 and a normal state (or a breakdown state) of the equipment 200.

Hereinafter, an example of the processor configured to calculate the modified RBF value indicating a distance between measured data of the equipment 200 and standard data corresponding to a normal state of the equipment 200 is described. Based on the description herein, one of ordinary skill in the art may easily achieve an example of the processor configured to calculate the modified RBF value indicating a distance between measured data of the equipment 200 and standard data corresponding to a breakdown state of the equipment 200.

According to embodiments, the processor 100 may be configured to determine the modified RBF value according to Equation 1 below.

$$S_j = \exp\left(-\frac{\sum_{i=1}^{n} w_i * \frac{\|Z_{i,j} - X_i\|^2}{2\sigma_i^2}}{\sum_{i=1}^{n} w_i}\right)$$ [Equation 1]

In Equation 1, $S_j$ is a modified RBF value calculated based on $j^{th}$ data. $Z_{i,j}$ indicates pieces of standard data, and $X_i$ indicates pieces of measurement data.

i is an ordinal number for identifying a dimension of data and has an integer value of 1 to n. As shown in this example, when eight measuring devices M1 to M8 are used, n is 8. A value of i of the data measured by the measuring device M1 may be 1, and a value of i of the data measured by the measuring device M2 may be 2.

$\sigma_i$ may standardize an $i^{th}$ component of the measurement data. $\sigma_i$ may be a standardization coefficient of the $i^{th}$ component of the measurement data. $\sigma_i$ may prevent some of the measuring devices M1 to M8 from being excessively dominant with excessive deviations, compared with measurement values of the other measuring devices M1 to M8. According to cases, $\sigma_i$ may assign a high weight to a component of the measurement data, the component being critical for sensing a breakdown of the equipment 200.

$w_i$ is a selection function of the $i^{th}$ component of the measurement data. In an RBF neural network, $w_i$ may select components of the data sensitive for a breakdown of the equipment 200 from among components of the data. $w_i$ may have a value of 0 or 1. When the measurement data $X_i$ has a low degree of sensitivity with respect to a breakdown, $w_i$ may be 0. When the measurement data $X_i$ has a high degree of sensitivity with respect to a breakdown, $w_i$ may be 1.

The processor 100 may be trained to classify the measurement data $X_i$ of the equipment 200 into a breakdown state and a normal state. The processor 100 may be configured to determine, based on a distance between the measurement data $X_i$ and the standard data whether the measurement data X is data of the equipment 200 in the breakdown state or data of the equipment 200 in the normal state.

When the distance between the measurement data X and the standard data $Z_{i,j}$ is sufficiently small, the RBF value $S_j$ according to the $j^{th}$ data may be approximated to 0. In this case, the processor 100 may determine that the equipment 200 is in the normal state.

When the distance between the measurement data $X_i$ and the standard data $Z_{i,j}$ is sufficiently large, the RBF value $S_j$ according to the $j^{th}$ data may be approximated to 1. In this case, the processor 100 may determine that the equipment 200 has a breakdown.

According to embodiments, the processor 100 may predict the likelihood of the breakdown of the equipment 200, based on a trend of $S_j$ in a series of the measurement data. According to embodiments, the processor 100 may predict the likelihood of the breakdown of the equipment 200, based on a change of the value of the $S_j$ toward 1 in the series of measurement data. According to embodiments, when the value of $S_j$ exceeds a threshold value (for example, 0.7) in specific measurement data, the processor 100 may determine that the equipment 200 is highly likely to have a breakdown.

The processor 100 may include a computing device, such as a workstation computer, a desktop computer, a laptop computer, a tablet computer, etc. The processor 100 may include a simple controller, a complex processor, such as a microprocessor, a central processing unit (CPU), a graphics processing unit (GPU), etc., a processor including software, dedicated hardware, or firmware. The processor 100 may be realized, for example, by a general-purpose computer or application-specific hardware, such as digital signal process (DSP), a field programmable gate array (FPGA), an application specific integrated circuit (ASIC), etc.

According to some embodiments, the operations of the processor 100 may be implemented by commands stored on a machine-readable medium readable and executable by one or more processors. Here, the machine-readable medium may include an arbitrary mechanism to store and/or transmit information in a form readable by a machine (for example, a computing device). For example, the machine-readable medium may include read-only memory (ROM), random-access memory (RAM), a magnetic disk storage medium, an optical storage medium, flash memory devices, and an optical, acoustic, or other type radio wave signal (for example, a carrier wave, infrared, or digital signal) and other arbitrary signals.

Firmware, software, routines, instructions, etc. for performing the operations described with reference to the processor 100 or performing arbitrary processes to be described hereinafter may be configured. For example, the processor 100 may be realized by a deep learning model trained to provide an RBF neural network according to Equation 1. For example, the processor 100 may be realized by a deep learning model configured to calculate the RBF value described with reference to Equation 1.

However, this is only for convenience of explanation, and the operations of the processor 100 described above may also be implemented by a computing processor, a processor, a controller, or other devices executing firmware, software, routines, instructions, etc.

FIG. 2 is a flowchart of a method of obtaining a model, according to embodiments.

Referring to FIGS. 1 and 2, in P10, an RBF neural network may be provided by using the processor 100.

The RBF neural network may be in compliance with Equation 2 below.

$$S'_j = \exp\left(-\frac{\|\vec{Z_j} - \vec{X}\|^2}{\sigma^2}\right)$$ [Equation 2]

While each of $Z_{i,j}$ and X is a scalar value in Equation 1, each of $\vec{Z_J}$ and $\vec{X}$ may be an n-dimensional row vector including n components in Equation 2. $\sigma$ may be a standard deviation of $\vec{X}$.

In an RBF, $\vec{Z_J}$ may indicate a central tendency of normal data, and a may indicate a width of the normal data. In P10, first, for $\vec{Z_J}$ and $\sigma$, the central tendency of the normal data and an estimation value with respect to a standard deviation may be used, respectively.

The processor 100 may update $\vec{Z_J}$ and $\sigma$ to improve the accuracy of prediction of the RBF neural network of Equation 2. Thus, $\vec{Z_J}$ and $\sigma$ may be determined. The operation of providing the estimation values of $\vec{Z_J}$ and $\sigma$ may be unsupervised learning, and the operation of updating $\vec{Z_J}$ and $\sigma$ may be supervised learning.

Next, in P20, a modified RBF neural network may be provided based on the RBF neural network by using the processor 100. The providing of the modified RBF neural network may include calculating $w_i$, $\sigma_i$, and standard data $Z_{i,j}$.

$w_i$ may be determined from a correlation coefficient of the standard data $Z_{i,j}$, but is not limited thereto. In more detail, $w_i$ may be determined according to Equation 3 below.

$$C=|corr(Z,Z)| \qquad \text{[Equation 3]}$$

Matrix C is a correlation matrix and may indicate a correlation coefficient between components of standard data. In more detail, each component of Matrix C may indicate an absolute value of the correlation coefficient between the components of the standard data. For example, a component (4,3) of Matrix C may be the correlation coefficient between a fourth component of the standard data and a third component of the standard data. As another example, a component (3,4) of Matrix C may be the correlation coefficient between the third component of the standard data and the fourth component of the standard data.

In Matrix C, a diagonal component is autocorrelational, and thus, is identically 1. Also, from a definition of Matrix C, it is obvious that Matrix C is a symmetric matrix (that is, symmetrical with respect to the diagonal component). For example, a value of the component (3,4) of Matrix C may be substantially the same as a value of the component (4,3) of Matrix C.

According to an embodiment, determining $w_i$ may include selecting any one of rows of Matrix C and comparing an $i^{th}$ component of the selected row of Matrix C with a threshold value. Here, the threshold value may be in a range of 0.5 to 0.7. The selecting of the row from Matrix C may be based on calculation of each component of the row. For example, a row of Matrix C having the maximum sum of components may be used in the determining of $w_i$.

For example, when a kth row of Matrix C is selected, $w_i$ may be determined according to Equation 4 below.

$$w_i = \begin{cases} 1 & (C_{k,i} > \text{threshold}) \\ 0 & (C_{k,i} \leq \text{threshold}) \end{cases} \qquad \text{[Equation 4]}$$

According to another embodiment, the determining of $w_i$ may include calculating an average of each column of Matrix C to calculate an n-dimensional row vector composed of the average of each column and comparing an $i^{th}$ component of the calculated n-dimensional row vector with a threshold value. Here, the threshold value may be in a range of 0.5 to 0.7.

An example of a1 may include a historical standard deviation of measurement data $X_i$. Here, the historical standard deviation of the measurement data $X_i$ may be a standard deviation of a set of the measurement data $X_i$ updated during a predetermined time period. Another example of $\sigma_i$ may include a calculation result based on the historical standard deviation of the measurement data $X_i$.

Unlike the case of an RBF according to the related art, $\sigma_i$ may have a different value for each component $X_i$ of data. Accordingly, an excessive decrease or an excessive increase of the contribution of the component $X_i$ of data selected (that is, corresponding to $w_i$ that is non-zero) in the modified RBF, to the modified RBF, may be prevented.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of using a system comprising a processor to determine in real time whether semiconductor equipment that is manufacturing semiconductor devices is broken down, the method comprising and by the processor:

obtaining a radial basis function (RBF) neural network configured to predict, based on n-dimensional measurement data with respect to the semiconductor equipment, a likelihood of the semiconductor equipment being broken down, wherein n is an integer;

modifying the RBF neural network to obtain a modified RBF neural network that assigns, to each of components of the measurement data, a standardization coefficient dependent on the components of the measurement data; and using the modified RBF neural network instead of the RBF neural network to predict, in the real time while the semiconductor equipment is manufacturing the semiconductor devices, the likelihood of the semiconductor equipment being broken down to prevent defects from being caused in the semiconductor devices by the semiconductor equipment actually being broken down.

2. The method of claim 1, wherein the standardization coefficient is n-dimensional.

3. The method of claim 1, wherein the standardization coefficient is determined based on a standard deviation of a corresponding component of the measurement data.

4. The method of claim 1, wherein the standardization coefficient prevents an excessive increase or an excessive decrease of an effect of each of the components of the measurement data on a calculation by the modified RBF neural network.

5. The method of claim 1, wherein, when the semiconductor equipment is determined by the processor to be in a breakdown state, an RBF value calculated by the modified RBF neural network is 1.

6. The method of claim 1, wherein, when the semiconductor equipment is determined by the processor to be in a normal state, an RBF value calculated by the modified RBF neural network is 0.

7. The method of claim 1, wherein the modified RBF neural network is configured to predict the likelihood of the semiconductor equipment being broken down using Equation 1 below:

$$S_j = \exp\left(-\frac{\sum_{i=1}^n w_i * \frac{\|Z_{i,j} - X_i\|^2}{2\sigma_i^2}}{\sum_{i=1}^n w_i}\right) \qquad \text{[Equation 1]}$$

where $S_j$ is a modified RBF value calculated based on the measurement data, $w_i$ selects an $i^{th}$ component of the measurement data, $\sigma_i$ standardizes the $i^{th}$ component of the measurement data, $Z_{i,j}$ is an $i^{th}$ component of standard data indicating a normal state of the semiconductor equipment, and $X_i$ is the $i^{th}$ component of the measurement data.

8. The method of claim 7, wherein $w_i$ has a value of 0 or 1.

9. The method of claim 7, wherein $w_i$ has a value determined based on a correlation coefficient between components of the standard data.

10. A system comprising:
a memory; and
a processor coupled to the memory, the system being a computing device and the processor is configured to:
generate, in real time, a prediction indicating a likelihood of semiconductor equipment being broken down using a modified radial basis function (RBF) neural network and measurement data with respect to the semiconductor equipment, the semiconductor equipment being used in the real time while the prediction is generated to manufacture semiconductor devices and the modified RBF neural network being based on following Equation 1:

$$S_j = \exp\left(-\frac{\sum_{i=1}^n w_i * \frac{\|Z_{i,j} - X_i\|^2}{2\sigma_i^2}}{\sum_{i=1}^n w_i}\right) \qquad \text{[Equation 1]}$$

where $S_j$ is a modified RBF value calculated based on the measurement data, $W_i$ selects an $i^{th}$ component of the measurement data, $\sigma_i$ standardizes the $i^{th}$ component of the measurement data, $Z_{i,j}$ is an $i^{th}$ component of standard data indicating a normal state of the semiconductor equipment, and $X_i$ is the $i^{th}$ component of the measurement data; and
using the prediction indicating the likelihood of the semiconductor equipment being broken down to prevent defects being caused in the semiconductor devices being manufactured by the semiconductor equipment in the real time.

11. The system of claim 10, wherein $w_i$ is determined by Matrix C calculated based on the standard data and following Equation 2:

$$C = |corr(Z,Z)| \qquad \text{[Equation 2]}$$

wherein Matrix C is a correlation coefficient between components of the standard data.

12. The system of claim 11, wherein, when an $i^{th}$ component of any one selected from among rows of Matrix C is less than or equal to a threshold value, $w_i$ has a value of 0.

13. The system of claim 11, wherein, when an $i^{th}$ component of any one selected from among rows of Matrix C is greater than or equal to a threshold value, $w_i$ has a value of 1.

14. The system of claim 13, wherein, wherein the threshold value is in a range of about 0.5 to about 0.7.

15. The system of claim 10, wherein $\sigma i$ is a standard deviation of the $i^{th}$ component of the measurement data.

16. A method of using a system comprising a processor to determine in real time whether semiconductor equipment that is manufacturing semiconductor devices is broken down, the method comprising and by the processor:
obtaining a radial basis function (RBF) neural network configured to predict, based on n-dimensional measurement data with respect to the semiconductor equipment, a likelihood of the semiconductor equipment being broken down, wherein n is an integer and the RBF neural network is based on following equation 1:

$$S'_j = \exp\left(-\frac{\|\vec{Z_j} - \vec{X}\|^2}{\sigma^2}\right) \qquad \text{[Equation 1]}$$

where $S'_j$ is an RBF value calculated based on measurement data of the semiconductor equipment, $\vec{Z_j}$ is standard data indicating a normal state of the semiconductor equipment, $\vec{X}$ is the measurement data, and $\sigma$ is a standard deviation of the measurement data;
modifying the RBF neural network to obtain a modified RBF neural network, the modified neural network being based on following Equation 2:

$$S_j = \exp\left(-\frac{\sum_{i=1}^n w_i * \frac{\|Z_{i,j} - X_i\|^2}{2\sigma_i^2}}{\sum_{i=1}^n w_i}\right) \qquad \text{[Equation 2]}$$

where $S_j$ is a modified RBF value calculated based on the measurement data, $w_i$ selects an $i^{th}$ component of the measurement data, $\sigma i$ standardizes the $i^{th}$ component of the measurement data, $Z_{i,j}$ is an $i^{th}$ component of the standard data indicating the normal state of the semiconductor equipment, and $X_i$ is the $i^{th}$ component of the measurement data; and
using the modified RBF neural network instead of the RBF neural network to predict, in the real time while the semiconductor equipment is manufacturing the semiconductor devices, the likelihood of the semiconductor equipment being broken down to prevent defects from being caused in the semiconductor devices by the semiconductor equipment actually being broken down.

17. The method of claim 16, wherein modifying the RBF neural network to obtain the modified RBF neural network comprises:
providing estimation values with respect to $\vec{Z_j}$; and $\sigma$; and
updating $\vec{Z_j}$ and $\sigma$ to improve accuracy of the RBF neural network.

18. The method of claim 17, wherein the providing of the estimation values with respect to $\vec{Z_j}$ and $\sigma$ comprises use of unsupervised learning, and the updating of $\vec{Z_j}$ and $\sigma$ comprises use of supervised learning.

19. The method of claim 16, wherein $w_i$ is determined by Matrix C calculated based on the standard data and following Equation 3:

$$C = |\mathrm{corr}(Z,Z)| \qquad \text{[Equation 3]}$$

wherein each of components of Matrix C is an absolute value of a correlation coefficient between components of the standard data.

20. The method of claim 19, wherein, when an $i^{th}$ component of any one selected from among rows of Matrix C is less than or equal to a threshold value, $w_i$ has a value of 0, when the $i^{th}$ component of any one selected from among the rows of Matrix C is greater than or equal to the threshold value, $w_i$ has a value of 1, and the threshold value is in a range of about 0.5 to about 0.7.

* * * * *